United States Patent
Chen

(10) Patent No.: US 8,189,874 B2
(45) Date of Patent: May 29, 2012

(54) METHOD FOR MOTION DETECTION OF HORIZONTAL LINE

(75) Inventor: Ying-Ru Chen, Tainan County (TW)

(73) Assignee: Himax Technologies Limited, Tainan (TW)

( * ) Notice: Subject to any disclaimer, the term of this patent is extended or adjusted under 35 U.S.C. 154(b) by 808 days.

(21) Appl. No.: 12/352,968

(22) Filed: Jan. 13, 2009

(65) Prior Publication Data
US 2010/0177199 A1    Jul. 15, 2010

(51) Int. Cl.
*G06K 9/00* (2006.01)
*H04N 11/20* (2006.01)
(52) U.S. Cl. .................. 382/107; 382/291; 348/452
(58) Field of Classification Search .......... 382/100, 382/103, 106, 107, 155, 168, 162, 173, 181, 382/194, 210, 232, 254–266, 274–276, 291, 382/305, 312; 375/240.12; 348/240.2, 449, 348/452
See application file for complete search history.

(56) References Cited

U.S. PATENT DOCUMENTS

| | | | | |
|---|---|---|---|---|
| 5,936,676 | A * | 8/1999 | Ledinh et al. | 348/452 |
| 6,985,187 | B2 * | 1/2006 | Han et al. | 348/452 |
| 7,269,220 | B2 * | 9/2007 | Alvarez | 375/240.12 |
| 7,307,664 | B2 * | 12/2007 | Wong | 348/452 |
| 7,362,379 | B2 * | 4/2008 | Michel et al. | 348/452 |
| 7,800,692 | B2 * | 9/2010 | Wredenhagen et al. | 348/449 |
| 8,054,344 | B2 * | 11/2011 | Cheung et al. | 348/240.2 |

* cited by examiner

*Primary Examiner* — Seyed Azarian
(74) *Attorney, Agent, or Firm* — J.C. Patents

(57) ABSTRACT

A method for motion detection of a horizontal line is provided. First, a horizontal motion area of the horizontal line is detected according to differences between corresponding target scan lines in adjacent fields. Next, the horizontal line within a horizontal motion area in a current field and in a previous field are respectively detected. Then, the horizontal motion of the horizontal line is detected if the horizontal line is detected in both the current field and the previous field. Finally, pixels of the horizontal line in the current field are set as static pixels and data of the horizontal line is calculated through de-interlacing of corresponding horizontal lines in the previous field and in a next field if the horizontal motion of the horizontal line is detected. As a result, the flickers occurred in the generated field data can be removed and the quality of vision can be improved.

9 Claims, 3 Drawing Sheets

METHOD FOR MOTION DETECTION OF HORIZONTAL LINE

BACKGROUND OF THE INVENTION

1. Field of the Invention

The present invention generally relates to a method of motion detection, and more particularly, to a method for motion detection of a horizontal line.

2. Description of Related Art

With development of multimedia technique, requirement for image quality is substantially increased. The image quality may be influenced by the noises generated during image capturing, signal conversion and signal transmission. Therefore, an image processing technique is required to eliminate the noises that may be sensed by human eyes. The image processing methods for noise reduction commonly include a spatial noise-reduction process and a temporal noise-reduction process.

The spatial noise-reduction process applies a filter to perform spatial filtering process on the pixels of a current field, so as to smooth and soften the field, and reduce a visual perception of the human eyes for the noises. However, such method generally leads to image blurs, which may influence the presentation of image details, such as edges and textures, for example.

The temporal noise-reduction process references information of a previous field, so as to perform temporal filtering process to the pixels of the current field. Since the current field is highly related to the previous field, the temporal noise-reduction process can maintain and reserve details of the field. However, when the temporal filtering process is performed on a moving object within the field, motion blurs may occur on the edges of the moving object. Therefore, a motion detection algorithm is provided to detect the moving pixels in the field, so as to adjust an intensity of the temporal filtering for eliminating the motion blurs.

Generally speaking, motion detection uses differences between corresponding pixels in the same parity field to determine whether the designated pixels are moving pixels or not. If the difference is larger than a preset threshold, it means a variation is occurred in the content of the video and the corresponding pixels are determined as the moving pixels, and if the difference is smaller than the preset threshold, it means no variation is occurred in the content of the video and the corresponding pixels are determined as the static pixels.

Through the motion detection as described above, motion information of pixels of the moving object is obtained and referenced for determining whether to use a spatial interpolation or a temporal interpolation method to generate the required field data, in which the temporal interpolation is used for calculating values of pixels in an area with no moving object and the spatial interpolation is used for calculating values of pixels in an area with the moving object.

As described in the above, the motion detection algorithm is complicated, especially for the motion detection of horizontal lines. The motion of the horizontal lines can be classified into the horizontal lines moving vertically and the horizontal lines moving horizontally. For the horizontal lines moving vertically, a spatial interpolation is required to generate field data thereof. For the horizontal lines moving horizontally, they are also detected as a moving area and the spatial interpolation is used to generate field data thereof. However, a variation between the field data of adjacent two fields that are respectively generated through the spatial interpolation usually results in appearance of flickers, which will influence quality of vision substantially.

SUMMARY OF THE INVENTION

In light of the above, the present invention provides a method for motion detection of a horizontal line, in which a temporal interpolation is used to generate field data of horizontal lines so as to improve quality of vision.

In order to achieve the above-mentioned or other objects, the present invention provides a method for motion detection of a horizontal line, adaptive for detecting horizontal motion of the horizontal line and calculating data thereof. First, a horizontal motion area of the horizontal line is detected according to differences between corresponding target scan lines in adjacent fields. Next, the horizontal line within a horizontal motion area in a current field and in a previous field are respectively detected. Then, the horizontal motion of the horizontal line is detected if the horizontal line is detected in both the current field and the previous field. Finally, pixels of the horizontal line in the current field are set as static pixels and data of the horizontal line is calculated through de-interlacing of corresponding horizontal lines in the previous field and in a next field if the horizontal motion of the horizontal line is detected.

According to an embodiment of the present invention, in the step of detecting an a horizontal motion area of the horizontal line according to the differences between the target scan lines of adjacent fields, a sum of differences between corresponding target scan lines in the adjacent fields is calculated and used to determined whether to within a predetermined range. If the sum of differences is within the predetermined range, then it is determined that there is a horizontal motion area of the horizontal line in the target scan lines of the adjacent fields.

According to an embodiment of the present invention, in the step of determining whether the sum of differences is within a predetermined range, it is determined whether the sum of differences is larger than a first threshold, and if yes, the pixels of the target scan line are set as moving pixels.

According to an embodiment of the present invention, in the step of determining whether the sum of differences is within a predetermined range, it is determined whether the sum of differences is smaller than a second threshold, and if yes, the pixels of the target scan line are set as static pixels.

According to an embodiment of the present invention, in the step of determining whether the sum of differences is within a predetermined range, it is determined whether the sum of differences is between the first threshold and the second threshold, and if yes, it is determined that there is a horizontal motion area of the horizontal line in the target scan lines of the adjacent fields.

According to an embodiment of the present invention, in the step of detecting the horizontal line within a horizontal motion area of the current field and the previous field respectively, the horizontal line within a horizontal motion area in the current field is detected and then the corresponding horizontal line within a horizontal motion area in the previous field is detected.

According to an embodiment of the present invention, in the step of detecting the horizontal line in the current field, a first sum of differences between two target scan lines in the current field and a second sum of differences between adjacent pixels of the target scan line in the current field are respectively calculated. Then, it is determined whether the first sum is larger than a first threshold and the second sum is smaller than a second threshold, and if yes, it is determined that the scan line between the two target scan line in the current field is the horizontal line.

According to an embodiment of the present invention, in the step of detecting the horizontal line in the previous field, a third sum of differences between two target scan lines in the previous field is calculated and a fourth sum of differences between adjacent pixels of each target scan line in the previous field is calculated. Then, it is determined whether the third sum is larger than the first threshold and the fourth sum is smaller than the second threshold, and if yes, it is determined that the scan line between the two target scan line in the previous field is the horizontal line.

According to an embodiment of the present invention, in the step of detecting the horizontal motion of the horizontal line, differences between corresponding pixels of the horizontal line in the current field and in the previous field are calculated and the pixels of the horizontal line are assigned as moving pixels or static pixels according to the differences. Next, the assigned moving pixels and the static pixels are grouped and an exchange times that the groups of the moving pixels and the static pixels are exchanged in the horizontal line is calculated. Then, it is determined whether the exchange times is larger than an exchange threshold, and if the exchange times is larger than the exchange threshold, it is determined that the horizontal line has the horizontal motion.

According to an embodiment of the present invention, the horizontal line comprises at least one scan lines and in the step of detecting the horizontal motion of the horizontal line, the horizontal motion of each of the scan lines of the horizontal line is detected respectively, and it is determined that the horizontal line has the horizontal motion if all of the scan lines of the horizontal line are detected as having horizontal motion.

In the present invention, horizontal motion of horizontal lines is detected and pixels in an area of the horizontal lines having horizontal motion are set as static pixels such that in a process of motion detection, a temporal interpolation is used to generate field data of those horizontal lines. Accordingly, the flickers occurred in the generated field data can be removed and the quality of vision can be improved.

In order to make the aforementioned and other objects, features, and advantages of the present invention comprehensible, preferred embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
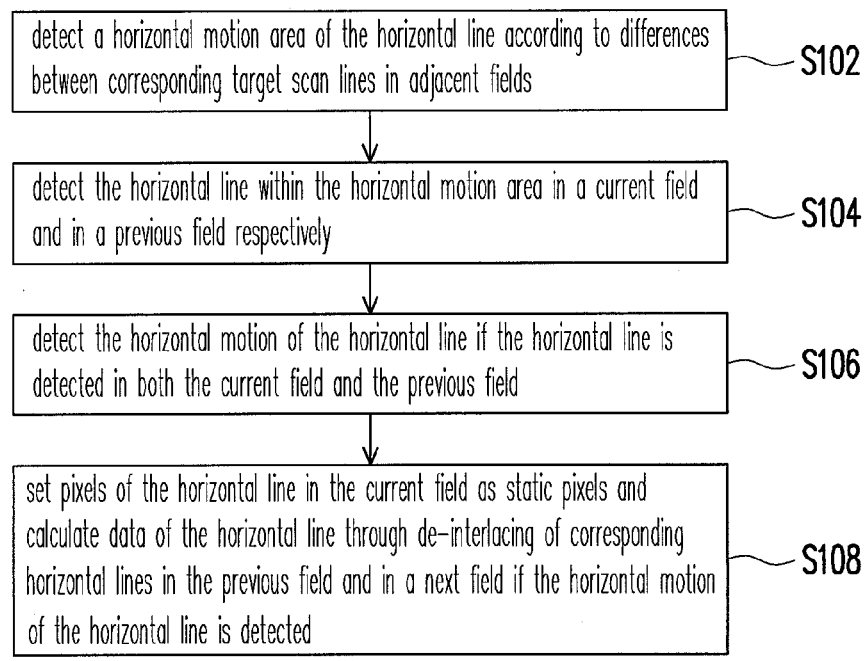
FIG. 1 is a flowchart illustrating a method for detecting horizontal motion of horizontal lines according to one embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

The present invention finds out an area that probably has horizontal motion of horizontal lines by using the differences between the fields. If the difference between corresponding fields is relatively large, the corresponding area is regarded as having vertical motion of horizontal lines. If the difference between corresponding fields is relatively small, the corresponding area is regarded as static area. Only if the difference between corresponding fields is in a relatively middle range, the corresponding area is regarded as having horizontal motion of horizontal lines and then a temporal interpolation is used to generate field data of the horizontal lines. Accordingly, the present invention provides a method for detecting horizontal motion of horizontal lines based on the aforesaid concept. In order to make the present invention more comprehensible, embodiments are described below as the examples to prove that the invention can actually be realized.

FIG. 1 is a flowchart illustrating a method for detecting horizontal motion of horizontal lines according to one embodiment of the present invention. Referring to FIG. 1, the present embodiment is adaptive for detecting horizontal motion of the horizontal line and calculating data thereof. The steps of the method are as follows.

First, a horizontal motion area of the horizontal line is detected according to differences between corresponding target scan lines in adjacent fields (S102). As described above, the magnitude of the differences between corresponding target scan lines in adjacent fields can be used to determine whether the corresponding area is a moving area, a static area, or an area having the horizontal line moved horizontally therein. To be specific, a sum of differences between corresponding target scan lines in the adjacent fields is calculated and used to determined whether to within a predetermined range, and if the sum of differences is within the predetermined range, then it can be determined that there is a horizontal motion area of the horizontal line in the target scan lines of the adjacent fields.

Figure 2:
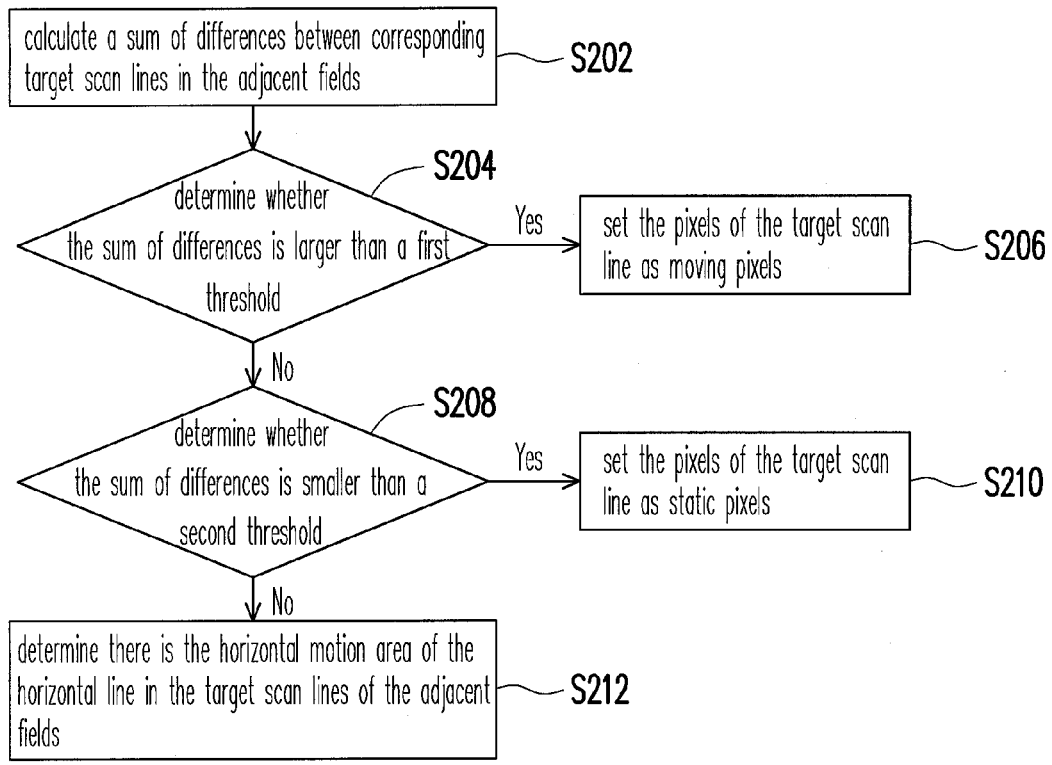
FIG. 2 is a flowchart illustrating a method for determining a horizontal motion area according to one embodiment of the present invention.

For example, FIG. 2 is a flowchart illustrating a method for determining a horizontal motion area according to one embodiment of the present invention. Referring to FIG. 2, the present embodiment defines a first threshold and a second threshold to distinguish the horizontal motion area of the horizontal line from the moving area and the static area in the adjacent fields. First, a sum of differences between corresponding target scan lines in the adjacent fields is calculated (S202). The sum of differences is then compared with the first threshold and determined whether to be larger than the first threshold (S204). If the sum of differences is larger than the first threshold, then the pixels of the target scan line are set as moving pixels (S206). Otherwise, the sum of differences is further compared with the second threshold and determined whether to be smaller than the second threshold (S208). If the sum of differences is smaller than the second threshold, then the pixels of the target scan line are set as static pixels (S210), and otherwise, it is determined that there is a horizontal motion area of the horizontal line in the target scan lines of the adjacent fields (S212).

Based on the above, when the horizontal motion area of the horizontal line is detected, the horizontal line within a horizontal motion area in a current field and in a previous field is respectively detected (S104). To be specific, the temporal interpolation can be use for detecting motion of horizontal lines only when the horizontal motion area is existed in both the current field and the previous field, such that it is necessary to find out the corresponding horizontal motion area in the current field and the previous field. Accordingly, the horizontal line within a horizontal motion area in the current field is detected and then the corresponding horizontal line within a corresponding horizontal motion area in the previous field is detected.

Figure 3:
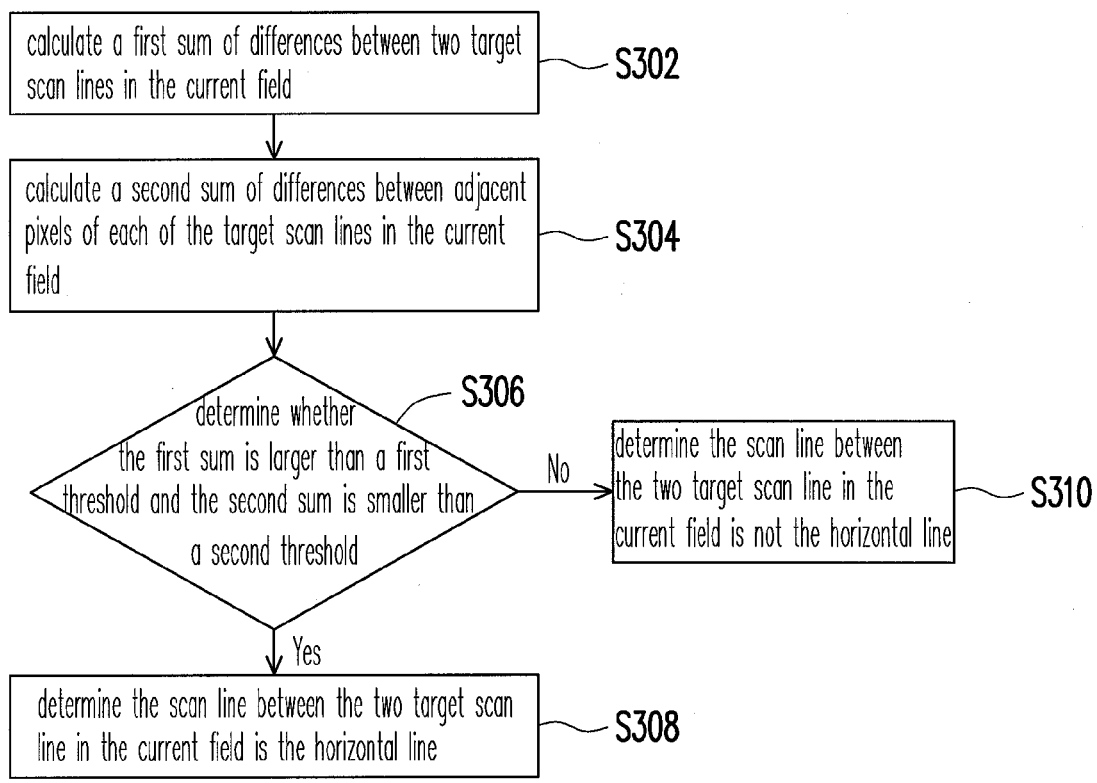
FIG. 3 is a flowchart illustrating a method for detecting the horizontal line in the current field according to one embodiment of the present invention.

FIG. 3 is a flowchart illustrating a method for detecting the horizontal line in the current field according to one embodiment of the present invention. Referring to FIG. 3, the present embodiment calculates a first sum of differences between two target scan lines in the current field (S302) and then calculates a second sum of differences between adjacent pixels of the target scan line in the current field (S304). Then, the first sum and the second sum are compared with each other to determine whether the first sum is larger than a first threshold and the second sum is smaller than a second threshold (S306). Only when the first sum is larger than the first threshold and the second sum is smaller than the second threshold, then it can be determined that the scan line between the two target scan line in the current field is the horizontal line (S308). Otherwise, it is determined that the scan line between the two target scan line in the current field is not the horizontal line (S310).

Similarly, for detecting the horizontal line in the previous field, a third sum of differences between two target scan lines in the previous field and a fourth sum of differences between adjacent pixels of each target scan line in the previous field are respectively calculated. Then, the third sum and the fourth sum are compared with each other to determine whether the third sum is larger than the first threshold and the fourth sum is smaller than the second threshold. Only when the third sum is larger than the first threshold and the fourth sum is smaller than the second threshold, then it can be determined that the scan line between the two target scan line in the previous field is the horizontal line. Otherwise, it is determined that the scan line between the two target scan line in the previous field is not the horizontal line.

Once the horizontal line is respectively detected within the horizontal motion area in the current field and in the previous field, it is determined the horizontal line is existed in the corresponding horizontal motion area of both the current field and the previous field, and then the horizontal motion of the horizontal line is further detected (S106). The horizontal motion of the horizontal line can be detected and confirmed by detecting the phenomenon of horizontal motion occurred in the vertical lines. To be specific, when the horizontal motion occurred in the vertical lines, pixels in a horizontal line that the vertical lines are across have the feature of alternately appearance of a group of moving pixels and a group of static pixels. Accordingly, the pixels in a horizontal line can be grouped into the moving pixels and the static pixels and a exchange times of the two kinds of group is calculated to detect the horizontal motion of the horizontal line. An embodiment is given below for further illustration.

Figure 4:
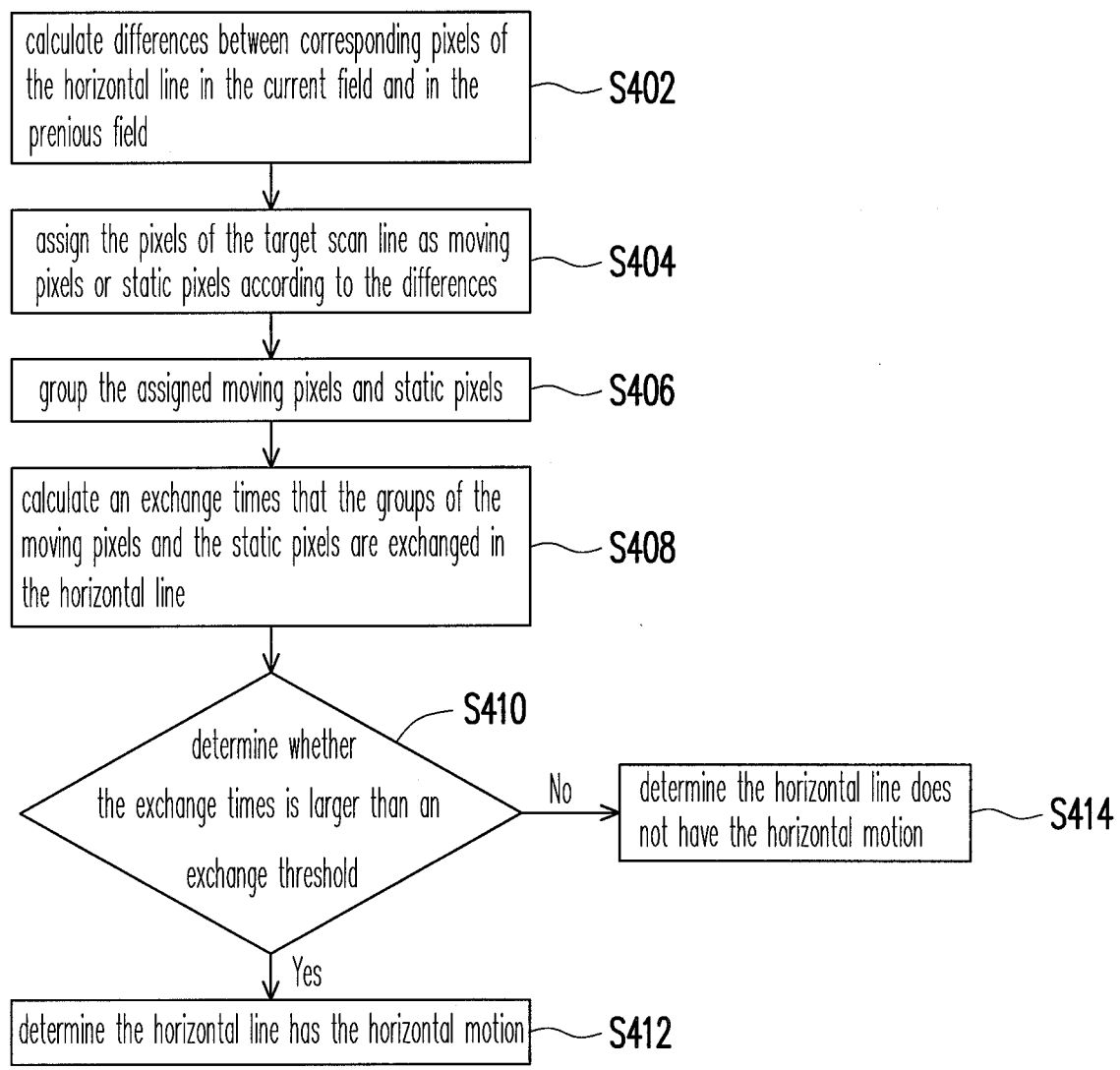
FIG. 4 is a flowchart illustrating a method for detecting the horizontal motion of the horizontal line according to one embodiment of the present invention.

FIG. 4 is a flowchart illustrating a method for detecting the horizontal motion of the horizontal line according to one embodiment of the present invention. Referring to FIG. 4, the present embodiment first calculates differences between corresponding pixels of the horizontal line in the current field and in the previous field (S402). According to the calculated differences, the pixels of the horizontal line can be assigned as moving pixels or static pixels (S404). To be specific, the difference of each of corresponding pixels of the horizontal line is compared with a predetermined threshold. If the difference is larger than the predetermined threshold, then it is determined the pixel of the horizontal line in the current field is a moving pixel, and otherwise, it is determined the pixel of the horizontal line in the current field is a static pixel.

When all the pixels of the horizontal line in the current field are all classified into the moving pixels and the static pixels, the assigned moving pixels and the static pixels are grouped (S406) and an exchange times that the groups of the moving pixels and the static pixels are exchanged in the horizontal line is further calculated (S408). The exchange times is then compared with an exchange threshold so as to determine whether the exchange times is larger than a threshold (S410). If the exchange times is determined as larger than the exchange threshold, then it is determined that the horizontal line has the horizontal motion (S412), and otherwise, it is determined that the horizontal line does not have the horizontal motion (S414).

It should be noted herein that the horizontal line may cover a plurality of scan lines and once the horizontal line contains more than one scan line, each of the scan lines with the horizontal line are respectively determined whether to have horizontal motion. Only if all of the scan lines of the horizontal line are detected as having horizontal motion, then it can be determined that the horizontal line has the horizontal motion.

When the horizontal motion of the horizontal line is detected in the step S106, the pixels of the horizontal line in the current field are set as static pixels, such that data of the horizontal line can be calculated through de-interlacing of corresponding horizontal lines in the previous field and in a next field (S108). That is to say, when a scan line is determined to fit all the requirement of a horizontal line as described above, the pixels of the scan line are all set as static pixels and a temporal interpolation is used to calculate the data of the scan line when performing motion detection on the scan line.

To sum up, the present invention provides a method for motion detection of a horizontal line, in which a horizontal motion area of the horizontal line is detected so as to find the horizontal line and the horizontal motion of the horizontal line is further detected to confirm the appearance of the horizontal line. Accordingly, the horizontal line can be precisely detected. Moreover, the pixels of the detected horizontal line are set as static pixels so as to apply temporal interpolation to generate field data of the horizontal line. As a result, the flickers occurred in the generated field data can be removed and the quality of vision can be improved.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for motion detection of a horizontal line, adaptive for detecting horizontal motion of the horizontal line and calculating data thereof, the method comprising:

detecting a horizontal motion area of the horizontal line according to differences between corresponding target scan lines in adjacent fields, comprising:

calculating a sum of differences between corresponding target scan lines in the adjacent fields;

determining whether the sum of differences is larger than a first threshold; and if yes, setting the pixels of the target scan line as moving pixels;

detecting the horizontal line within a horizontal motion area in a current field and in a previous field respectively;

detecting the horizontal motion of the horizontal line if the horizontal line is detected in both the current field and the previous field; and setting pixels of the horizontal line in the current field as static pixels and calculating data of the horizontal line through de-interlacing of corresponding horizontal lines in the previous field and in a next field if the horizontal motion of the horizontal line is detected.

2. The method for motion detection of a horizontal line according to claim 1, wherein after the step of calculating the sum of differences between corresponding target scan lines in the adjacent fields, the method further comprises:
determining whether the sum of differences is smaller than a second threshold; and
if yes, setting the pixels of the target scan line as static pixels.

3. The method for motion detection of a horizontal line according to claim 2, wherein after the step of calculating the sum of differences between corresponding target scan lines in the adjacent fields, the method further comprises:
determining whether the sum of differences is between the first threshold and the second threshold; and
if yes, determining there is a horizontal motion area of the horizontal line in the target scan lines of the adjacent fields.

4. The method for motion detection of a horizontal line according to claim 1, wherein the step of detecting the horizontal line within a horizontal motion area of the current field and the previous field respectively comprises:
detecting the horizontal line within a horizontal motion area in the current field; and
detecting the corresponding horizontal line within a horizontal motion area in the previous field.

5. The method for motion detection of a horizontal line according to claim 4, wherein the step of detecting the horizontal line in the current field comprises:
calculating a first sum of differences between two target scan lines in the current field;
calculating a second sum of differences between adjacent pixels of the target scan line in the current field;
determining whether the first sum is larger than a first threshold and the second sum is smaller than a second threshold; and
if yes, determining the scan line between the two target scan line in the current field is the horizontal line.

6. The method for motion detection of a horizontal line according to claim 4, wherein the step of detecting the horizontal line in the previous field comprises:
calculating a third sum of differences between two target scan lines in the previous field;
calculating a fourth sum of differences between adjacent pixels of each target scan line in the previous field;
determining whether the third sum is larger than the first threshold and the fourth sum is smaller than the second threshold; and
if yes, determining the scan line between the two target scan line in the previous field is the horizontal line.

7. The method for motion detection of a horizontal line according to claim 1, wherein the step of detecting the horizontal motion of the horizontal line comprises:
calculating differences between corresponding pixels of the horizontal line in the current field and in the previous field;
assigning the pixels of the horizontal line as moving pixels or static pixels according to the differences;
grouping the assigned moving pixels and the static pixels;
calculating an exchange times that the groups of the moving pixels and the static pixels are exchanged in the horizontal line;
determining whether the exchange times is larger than an exchange threshold; and
determining the horizontal line has the horizontal motion if the exchange times is larger than the exchange threshold.

8. The method for motion detection of a horizontal line according to claim 7, wherein the horizontal line comprises at least one scan lines.

9. The method for motion detection of a horizontal line according to claim 8, wherein the step of detecting the horizontal motion of the horizontal line comprises:
detecting the horizontal motion of each of the scan lines of the horizontal line respectively; and
determining the horizontal line has the horizontal motion if all of the scan lines of the horizontal line are detected as having horizontal motion.

* * * * *